(12) United States Patent
Stern et al.

(10) Patent No.: US 7,418,653 B1
(45) Date of Patent: Aug. 26, 2008

(54) SYSTEM AND METHOD FOR DATA PUBLICATION THROUGH WEB PAGES

(75) Inventors: Yonatan Pesach Stern, Kfar Saba (IL); Emil Shtrinvil, Kfar Saba (IL)

(73) Assignee: Olive Software Inc., Aurora, CO (US)

( * ) Notice: Subject to any disclaimer, the term of this patent is extended or adjusted under 35 U.S.C. 154(b) by 630 days.

(21) Appl. No.: 09/714,207

(22) Filed: Nov. 17, 2000

(51) Int. Cl.
*G06F 17/00* (2006.01)

(52) U.S. Cl. .................. 715/204; 715/202; 715/235; 704/9

(58) Field of Classification Search .................. 715/517, 715/509, 513, 526, 522, 527, 204, 209–273; 707/100, 3, 10, 205; 705/27; 709/221, 217; 345/788; 382/176
See application file for complete search history.

(56) References Cited

U.S. PATENT DOCUMENTS

| | | | | |
|---|---|---|---|---|
| 5,893,127 | A * | 4/1999 | Tyan et al. | 715/513 |
| 5,907,837 | A * | 5/1999 | Ferrel et al. | 707/3 |
| 5,953,733 | A * | 9/1999 | Langford-Wilson | 715/517 |
| 5,963,966 | A * | 10/1999 | Mitchell et al. | 715/513 |
| 6,023,714 | A * | 2/2000 | Hill et al. | 715/513 |
| 6,088,708 | A * | 7/2000 | Burch et al. | 715/509 |
| 6,185,589 | B1 * | 2/2001 | Votipka | 715/517 |
| 6,199,082 | B1 * | 3/2001 | Ferrel et al. | 715/522 |
| 6,313,854 | B1 * | 11/2001 | Gibson | 345/788 |
| 6,324,554 | B1 * | 11/2001 | Watanabe et al. | 715/517 |
| 6,336,124 | B1 * | 1/2002 | Alam et al. | 715/523 |
| 6,377,704 | B1 * | 4/2002 | Cooperman | 382/176 |
| 6,507,856 | B1 * | 1/2003 | Chen et al. | 715/513 |
| 6,691,281 | B1 * | 2/2004 | Sorge et al. | 715/503 |
| 6,708,189 | B1 * | 3/2004 | Fitzsimons et al. | 707/205 |
| 2002/0029232 | A1 * | 3/2002 | Bobrow et al. | 707/517 |
| 2003/0140315 | A1 * | 7/2003 | Blumberg et al. | 715/527 |
| 2005/0055420 | A1 * | 3/2005 | Wyler | 709/217 |

OTHER PUBLICATIONS

Worring et al., From Linear to Non-Linear Reading: A Case Study to Provide Internet Access to Paper Documents, 4th International Conference Document Analysis and Recognition (ICDAR '97), vol. I and II, Aug. 18-20, 1997.

Tao Hong et al., Representing OCRed documents in HTML, 4th International Conference Document Analysis and Recognition (ICDAR '97), vol. I and II, Aug. 18-20, 1997, Ulm Germany.

(Continued)

*Primary Examiner*—Doug Hutton
*Assistant Examiner*—Quoc A Tran (57) ABSTRACT

A system and a method for publishing a newspaper page or other data through a Web page, such that the information can be made available more easily through a network such as the Internet. The data is automatically converted to the Web page format by first rendering the newspaper page into a digital format; converting the digital format to a basic internal publishing format; and then publishing the data in any one of a number of different possible publishing formats, including but not limited, a mark-up language document such as a Web page for example. The present invention supports such advanced features as arrangement of the content of the newspaper according to relationships within the information of the content and/or according to the preference(s) of the user by analyzing the newspaper page as a plurality of objects. Each newspaper object may optionally be a title, an article, a picture and/or other graphic advertisement, and so forth.

31 Claims, 5 Drawing Sheets

OTHER PUBLICATIONS

Altamura et al., An Interactive and Adaptive Document Analysis System, 5th International Conference Document Analysis and Recognition, Sep. 20-22, 1999, Bangalore, India.

Rogers, et al., The ISL Document Image Analysis Toolbox, 1997 Workshop on Document Image Analysis (DIA '97), Jun. 20, 1997, San Juan, Puerto Rico.

Matthews et al. "Creating Graphics for FrontPage Webs", FrontPage 2000, Chap.5: 214-237, 1999.

Dail "ActivePaper XML Structure in Brief", Internet Article 'Online! Retrieved From the Internet: URL: http://www.1fnet.it/oclc/olive/olive_ActivePaper_XML_structure.doc>, 2002.

* cited by examiner

Figure 2 (con't)

Figure 2 (con't)

recognize various types of
specific units of data
(step 14)

entities are created from areas
(step 15)

resolve additional ambiguities
(step 16)

SYSTEM AND METHOD FOR DATA PUBLICATION THROUGH WEB PAGES

FIELD AND BACKGROUND OF THE INVENTION

The present invention relates to a system and a method for the publication of data through Web pages, and in particular, for such a system and method in which data is automatically converted to a format which is suitable for direct publication as a Web page.

As the Internet grows, many different types of Web sites are becoming connected and therefore are available to users. A Web site refers to a type of graphical document presentation which is available through the "World Wide Web", or simply "Web", which may also be viewed as a subset of the content which is generally available through the Internet. These Web sites may contain information which is of interest to users, such as news for example. Indeed, many Internet users today obtain at least a portion of their news information from Web sites which publish such information.

Traditional newspapers and other sources of news have therefore been forced to embrace the new media which is represented by Web pages. Currently, many traditional (print) newspapers have Web sites which contain at least a portion of the news and information which is available through the print version of the newspaper. However, managing such Web sites can be cumbersome, since currently there is no simple mechanism for converting data which is available as the printed newspaper, into a format which can be directly published through the Web site. Indeed, typically newspaper publishers currently produce content for the Web site by manually reformatting the newspaper data into a format which is suitable for Web pages. Therefore, the content which is available at the Web site tends to be a relatively limited subset of the total content of the newspaper, with a structure which is not necessarily suitable for the Web site, but instead tends to reflect the structure of the printed newspaper. Thus, given the relatively limited nature of the content of the Web site, and the limited interaction with that content which is provided through the Web pages, newspapers have generally been unsuccessful at charging for the content which is available through the Web site. Indeed, the Web site may even compete with the newspaper for paying readers, thus potentially even harming the economic interests of the newspaper.

A more useful solution to this problem would enable the newspaper to more easily and more cost effectively publish news and other information through the Web site, by providing a mechanism for directly publishing the newspaper data in a format suitable for Web pages, thereby reducing the expenses associated with the maintenance of the Web site. In addition, this solution would also enable the newspapers to publish more news and information through the Web site, in a more elaborate and user-friendly layout format, such that the content of the Web site would be of greater interest to the readers of the newspaper. Such enhanced content could even be suitable for being sold by the newspaper, such that the newspaper could charge for access to the Web site content. Thus, rather than reducing the income of the newspaper, the Web site could even increase the number of paying readers and hence increase the income of the newspaper, for example by enabling international subscribers to receive a subscription to the Web site of the newspaper who would otherwise have difficulty obtaining the printed version.

Therefore, there is an unmet need for, and it would be highly useful to have, a system and a method for publishing data through Web pages, such that the data is automatically converted to a format which is suitable for publication as a Web page, preferably through the XML (extensible mark-up language) mark-up language, and such that the structure of the published content uses the interactive capabilities of the Web page to their fullest extent.

SUMMARY OF THE INVENTION

The present invention is of a system and a method for publishing a newspaper page or other data through a Web page, such that the information can be made available more easily through a network such as the Internet. The data is automatically converted to the Web page format by first rendering the newspaper page into a digital format; converting the digital format to a basic internal publishing format; and then publishing the data in any one of a number of different possible publishing formats, including but not limited, a mark-up language document such as a Web page for example. Optionally and preferably, according to the present invention, the newspaper page is viewed as a collection of individual objects, which are organized according to a particular order on the printed newspaper page. Examples of such objects include, but are not limited to, a picture, a story, a headline, advertisements and so forth. With regard to each article, additional examples include, but are not limited to, roof title, abstract, subtitle, lead, caption, continuation, byline and so forth.

According to preferred embodiments of the present invention, the structure of the published content uses the interactive capabilities of the Web page to their fullest extent, by enabling the user to view different portions of the content in any desired order, with links between these portions being made according to the information in the content and/or according to the type of content, rather than according to an arbitrary structure imposed according to the requirements of the printed newspaper. In addition, optionally and preferably, the user is able select different portions of the newspaper content for viewing according to a structure and/or order which is requested by the user, rather than being imposed by the publisher. Thus, for example, the above newspaper objects on the newspaper page are optionally selected and/or rearranged according to the request of the user.

According to the present invention, there is provided a method for automatically publishing data in a final publication format, the method comprising the steps of: (a) analyzing the data to decompose the data into a plurality of objects; (b) converting each object to an internal publication format; and (c) rendering the internal publication format in the final publication format.

According to another embodiment of the present invention, there is provided a system for automatically publishing data in a computerized format, the system comprising: (a) a source of the data in a digital format; (b) a mark-up language distiller module for converting the data in the digital format to a mark-up language format; and (c) a publisher server for converting the data from the mark-up language format to a final publication format.

Hereinafter, the term "network" refers to a connection between any two or more computational devices which permits the transmission of data.

Hereinafter, the term "computational device" includes, but is not limited to, personal computers (PC) having an operating system such as DOS, Windows™, OS/2™ or Linux; Macintosh™ computers; computers having JAVA™-OS as the operating system; graphical workstations such as the computers of Sun Microsystems™ and Silicon Graphics™, and other computers having some version of the UNIX operating system such as AIX™ or SOLARIS™ of Sun Microsystems™; or any other known and available operating system, or any device, including but not limited to: laptops, hand-held computers, PDA (personal data assistant) devices, cellular telephones, any type of WAP (wireless application protocol) enabled device, wearable computers of any sort, which can be connected to a network as previously defined and which has an operating system. Hereinafter, the term "Windows™" includes but is not limited to Windows95™, Windows NT™, Windows98™, Windows CE™, Windows2000™, and any upgraded versions of these operating systems by Microsoft Corp. (USA).

For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

In addition, the present invention could be implemented as software, firmware or hardware, or as a combination thereof. For any of these implementations, the functional steps performed by the method could be described as a plurality of instructions performed by a data processor.

Hereinafter, the term "Web browser" refers to any software program which can display text, graphics, or both, from Web pages on World Wide Web sites. Hereinafter, the term "Web server" refers to a server capable of transmitting a Web page to the Web browser upon request.

Hereinafter, the term "Web page" refers to any document written in a mark-up language including, but not limited to, HTML (hypertext mark-up language) or VRML (virtual reality modeling language), dynamic HTML, XML (extensible mark-up language) or XSL (XML styling language), or related computer languages thereof, as well as to any collection of such documents reachable through one specific Internet address or at one specific World Wide Web site, or any document obtainable through a particular URL (Uniform Resource Locator). Hereinafter, the term "Web site" refers to at least one Web page, and preferably a plurality of Web pages, virtually connected to form a coherent group.

Hereinafter, the phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and a method for publishing a newspaper page or other data through a Web page, such that the information can be made available more easily through a network such as the Internet. The data is automatically converted to the Web page format by first rendering the newspaper page into a digital format; converting the digital format to a basic internal publishing format; and then publishing the data in any one of a number of different possible publishing formats, including but not limited, a mark-up language document such as a Web page for example. However, as described with regard to the preferred embodiments below, the present invention does not merely convert the data from one format to a different format, but instead is able to also provide at least a basic structure for organizing the data into the Web page.

According to preferred embodiments of the present invention, the structure of the published content uses the interactive capabilities of the Web page to their fullest extent, by enabling the user to view different portions of the content in any desired order, with links between these portions being made according to the information in the content and/or according to the type of content, rather than according to an arbitrary structure imposed according to the requirements of the printed newspaper. In addition, optionally and preferably, the user is able select different portions of the newspaper content for viewing according to a structure and/or order which is requested by the user, rather than being imposed by the publisher.

The present invention optionally and preferably realizes these goals by providing a method for automatic recognition of objects on the newspaper page, which are then published to the Web. Therefore, the newspaper page is viewed as a collection of individual objects, which are organized according to a particular order on the printed newspaper page. Examples of such objects include, but are not limited to, a picture, a story, a headline, advertisements and so forth. With regard to each article, additional examples include, but are not limited to, roof title, abstract, subtitle, lead, caption, continuation, byline and so forth. These objects may optionally be rearranged according to any desired order for the Web page, and are preferably not limited only to the order which is required for printing on the printed paper version of the newspaper. Optionally and more preferably, the objects are first classified according to different types, for example according to the type of content, before being organized into the Web page.

The principles and operation of the present invention may be better understood with reference to the drawings and the accompanying description.

Figure 1:
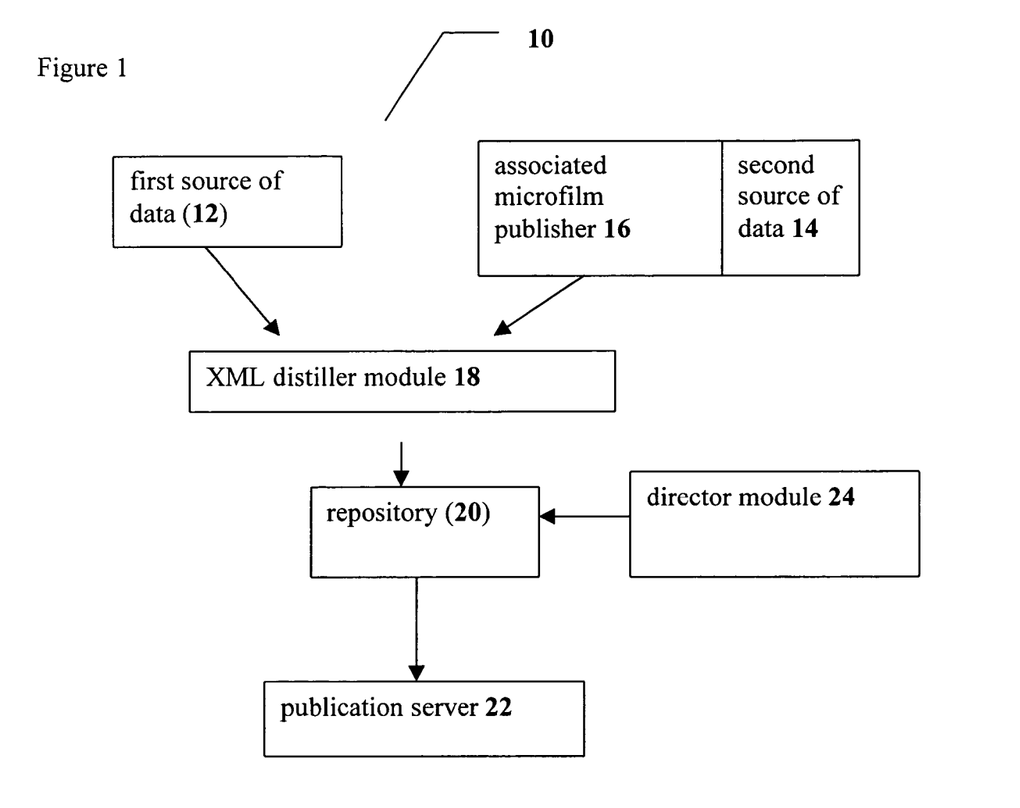
FIG. 1 is a schematic block diagram of an exemplary system according to the present invention.

Referring now to the drawings, FIG. 1 is a schematic block diagram of a system according to the present invention for automatically publishing data in a Web page format. Although the present invention is explained with regard to publishing newspaper data, it is understood that this is for the purposes of explanation only and is without any intention of being limiting.

As shown, a system 10 optionally and preferably features different sources of data, such as a first source 12 which contains new data, for current publication in the newspaper; and a second source 14 which contains archived data. First source 12 and second source 14 may be typically expected to only contain general information about the text itself and the fonts for printing the text, possibly with information about the reproduction of the text for each line thereof. Such limited information is often available because many "on-line" or Web page publications present newspaper pages in PostScript™ or PDF formats. These formats contain information about each character and each line, but do not contain information about high level objects such as classification of the information by article, title, caption, picture and so forth. Furthermore, most archived data is only available for presentation in image formats like TIFF, for example. These image formats contain only the page image at a high resolution.

One of the advantages of the present invention is that archived data can optionally be easily integrated with current sources of data, such that the newspaper which is published in the Web page format can represent a combination of current and previously published information. Second source 14 is shown as microfilm data, with an optional but preferred associated microfilm publisher 16 according to the present invention, for converting the microfilm data into a digital format, by converting the microfilm data to digital images.

Optionally, the scanned microfilm data is preprocessed in order to clean the data, for example in order to improve image quality, crop the black adages and straighten the images. Preferably, the scanned microfilm format is TIFF, and the digital format data is in the PDF format. Microfilm publisher 16 more preferably performs the following functions. First, microfilm publisher 16 performs optical character recognition (OCR), including recognition of fonts and coordinates for the text. The recognition of text is important for enabling free text searching and indexing of the newspaper data.

Next, microfilm publisher 16 preferably recognizes pictures, photos and other graphic images. Microfilm publisher 16 also preferably recognizes vertical and horizontal lines, frames and background images. The output data is then preferably in the PDF format, or alternatively another suitable type of digital data format.

Data which is in a digital format can then optionally and more preferably be converted to a basic internal format. The basic internal format can then more preferably be converted to a variety of different final formats for publication. Therefore, preferably the digital format data is only converted to a single format before publication in a variety of formats, in order to increase the efficiency of the conversion process.

As shown, the internal format is optionally and preferably XML, although substantially any other type of mark-up language could also be used. The conversion process is preferably performed by an XML distiller module 18.

Next, XML distiller module 18 preferably performs intelligent structure analysis, in order to be able to recognize and define the structures and objects contained in the newspaper data, particularly with regard to each page of the newspaper. Examples of such structures and objects include, but are not limited to, articles, advertisements, titles, and so forth. More preferably, the newspaper objects are classified as one of a plurality of specific entities, which optionally and most preferably are selected from the group consisting of an article, an advertisement, a picture which is not otherwise associated with an article or advertisement, and general data, which covers information that does not fit into one of the preceding categories. Examples of general data include, but are not limited to, crossword puzzles, television guide listings, stock quotes and so forth.

Recognition of the hierarchy for newspaper objects is an important part of the process. One illustrative, non-limiting example of such a hierarchy for recognized newspaper objects is the following: Newspaper→Section→Page→Subsection→Article→Photograph→Caption→Photographer (by name).

The process of intelligent structure analysis enables the newspaper data to be converted to a series of objects, for more efficient search and retrieval through the Internet or other network.

After the process of intelligent structure analysis has been completed, XML distiller module 18 preferably performs XML encoding of the object data. This process results in a set of enhanced, structured files which combine the original image of the data, optionally in the TIF format as previously described, but preferably in the GIF and/or JPG formats, with the text and XML information. Each such file thus preferably maintains the visual aspects of the newspaper layout, while enabling far greater functionality to be available through the Web page version of the newspaper.

According to preferred embodiments of the present invention, XML distiller module 18 optionally and preferably is able to perform a number of additional functions, for greater flexibility in creating the desired Web page structures. For example, XML distiller module 18 is more preferably able to intelligently create a single Web "page" from multiple page files, for example in order to permit a story object which is printed on multiple pages in the printed newspaper version, to be available on a single Web page in the "on-line" version.

Optionally and more preferably, XML distiller module 18 is able to recognize such features of the printed newspaper page as double pages, and the presence of different sections and subsections in the printed newspaper. Such an analysis is most preferably presented to the user through a graphic user interface (GUI) in a visual representation, for example by displaying each entity with a unique color, and displaying each element with a special hatching pattern and title. The user is then most preferably able to manually edit these intelligent analysis results. Also most preferably, XML distiller module 18 is able to learn while the user is performing such a manual editing process, for example in order to be able to classify a newspaper object properly in the future according to the request of the user.

In addition, XML distiller module 18 is optionally and more preferably able to detect and report "suspicious" results of the intelligent analysis. These results may include possibly incorrectly classified newspaper objects, for example. XML distiller module 18 is then more preferably able to provide an interface, such as a GUI, to the user for navigating through these suspicious results.

Once the data is ready in the internal published format, such as XML for example, the data is preferably stored in a repository 20 according to the present invention. Repository 20 is preferably a structured database, which contains the internal format data for publication in a final format.

The basic internal format represents the content of a newspaper repository, such as repository 20 for example. Repository 20 could optionally contain millions of newspapers from many different publishers, derived from formats such as PostScript, PDF, and TIFF. The source files can optionally be produced by electronic pagination systems like Quark XPress™, which can then generate a PostScript™ or PDF file; or alternatively by scanning data from microfilm or paper and then by converting such scanned data to an image file format such as TIFF for example.

The basic information object of repository 20 is preferably the entity. An entity can be an article, a standalone picture, an advertisement, and so forth, as it is the digitized representation of a self-contained piece of printed content. Repository 20 preferably stores these information objects in two different data formats: a suitable Web page and/or document mark-up language format, such as XML for example, and one or more image format types.

The version of the entity which is stored in the mark-up language format, such as XML, preferably contains the actual content of the newspaper object, as well as details of the internal structure and relationship(s) between its various components, more preferably for both the content itself and for the visual layout of the content on the printed newspaper page.

A document mark-up language such as XML is particularly preferred for storing this type of information about the entity, as XML tags such as Byline, Caption, Lead, Roof-title, and so forth may optionally be used, which reflect the high-level information structure of the entity. These elements are more preferably comprised of lower-level elements called primitives, which are the true building-blocks of repository 20. A primitive is a rectangular region of a printed newspaper page, which contains textual and/or graphical information. Articles and other entities on the printed newspaper page are optionally and preferably represented as a "puzzle", or structured collection, of the rectangular primitives from which the printed page is composed. Child elements of articles, like tables or pictures, can also optionally be composed of one or more such primitives.

Primitives preferably comprise lines, words, and quads (which together form broken or multiple-style words). Each word XML tag then optionally and preferably contains attributes such as page coordinates and font information (supplied as Font Style Gallery references). Storing the original position and style of each element in the original document, such as printed newspaper page for example, supports a rich set of applications that can optionally mimic the design of the printed edition. The ability to optionally imitate the format and design of the printed newspaper edition is especially important for publishing magazines on the Internet and other types of documents for which a strong visual appearance is important. Such an ability is also potentially advantageous for printed newspapers which wish to extend the appeal of their printed editions (current and historic) to the web.

The meta-data tag for the XML format version of each entity preferably collects knowledge about the environment of the entity, such as information related to the section of the newspaper to which the entity belongs, the page on which the entity is located, the size of the entity, and the article(s) to which the entity is related. However, meta-data more preferably does not include any actual content, but only a description of the entity information or attributes surrounding the content.

The global Font Style Gallery is a preferred feature of the present invention, which contains descriptions of all the font styles (comprised of font types, sizes and colors) in the newspaper issue. The Style Gallery is more preferably shared by all entities, and is most preferably represented as an external unit in the XML format data for each newspaper issue. The Style Gallery is, however, optionally and most preferably unique for each newspaper issue, thus supporting the dynamic nature of the newspaper's design.

The XML format data in repository 20 is preferably complemented by images, which are snapshots of the original, printed representation of each information object. Repository 20 optionally and more preferably contains a set of images representing the entire newspaper issue, piece by piece, in different resolutions and formats. These images are a powerful tool when combined with the XML format data for each entity, which details each the role and position of each entity on the original printed newspaper page.

Repository 20 preferably stores content both as XML and as images, as previously described, thereby allowing dual presentation. Dual presentation is particularly important and preferred for the construction of archive applications from scanned images. For these archives, the XML format data alone may optionally be insufficient to present the document for high quality display and reading. Such relatively low quality may be caused by the relatively low level of the original font and style recognition, and to error rate caused by the OCR (optical character recognition) process, which may be as high as 10-20% of all characters or even higher. Therefore, in cases where post-OCR scanned images are used as a source of data, images play a very important role, serving as a content holder and enabling the presentation of the original style.

Optionally and more preferably, the internal format data is published in a plurality of different final formats by publication server 22. These different formats may optionally include, but are not limited to, any one or more of a mark-up language document such as a document in XML or HTML for example; a wireless-enabled document such as a WML document for example; the ASCII text format; and a format which is suitable for publication through a technology such as Web TV for example.

More preferably, these different final formats are at least partially determined according to the different types of hardware devices which are available for presenting the published data to the viewing user. Examples of such hardware devices include, but are not limited to, media and/or display devices such as Web TV, Pocket PC and WAP-enabled devices such as cellular telephones for example. Therefore, preferably the digital format data is only converted to a single format before publication in a variety of formats, in order to increase the efficiency of the conversion process.

According to preferred embodiments of the present invention, publication server 22 is optionally and preferably able to perform "on the fly" conversions of the basic internal format, and/or the XML data format, into one or more final formats. Such rapid, real-time or "on the fly" conversions provides support for responses to dynamic queries from different terminal devices to repository 20. In addition, new kinds of supported hardware devices and/or terminal types can optionally easily be performed without changes to repository 20.

For these preferred embodiments of the present invention, publication server 22 preferably features automatic detection of the type of hardware device which has submitted the query. Publication server 22 then preferably performs dynamic (XSL based conversions) of pages, entities and elements according to the source of the query. In addition, publication server 22 also preferably supports textual and meta-data search support according to the XML structure of the entity, as previously described. Publication server 22 can then also optionally offer dynamic presentation of search results in XML format, and the dynamic addition of hit elements to XML entities which are discovered, for emphasizing searched words and phrases inside the text of the entity.

Optionally and more preferably, a director module 24 is able to manipulate the content of the data which is stored in repository 20, for example by editing the data. In addition, director module 24 is preferably able to define style sheets and other layout information for the different formats which are published through publication server 22. Thus, director module 24 most preferably enables the internal format data to be adjusted automatically for publication in each final publication format, in order to most advantageously display the data in each type of format.

Figure 2:
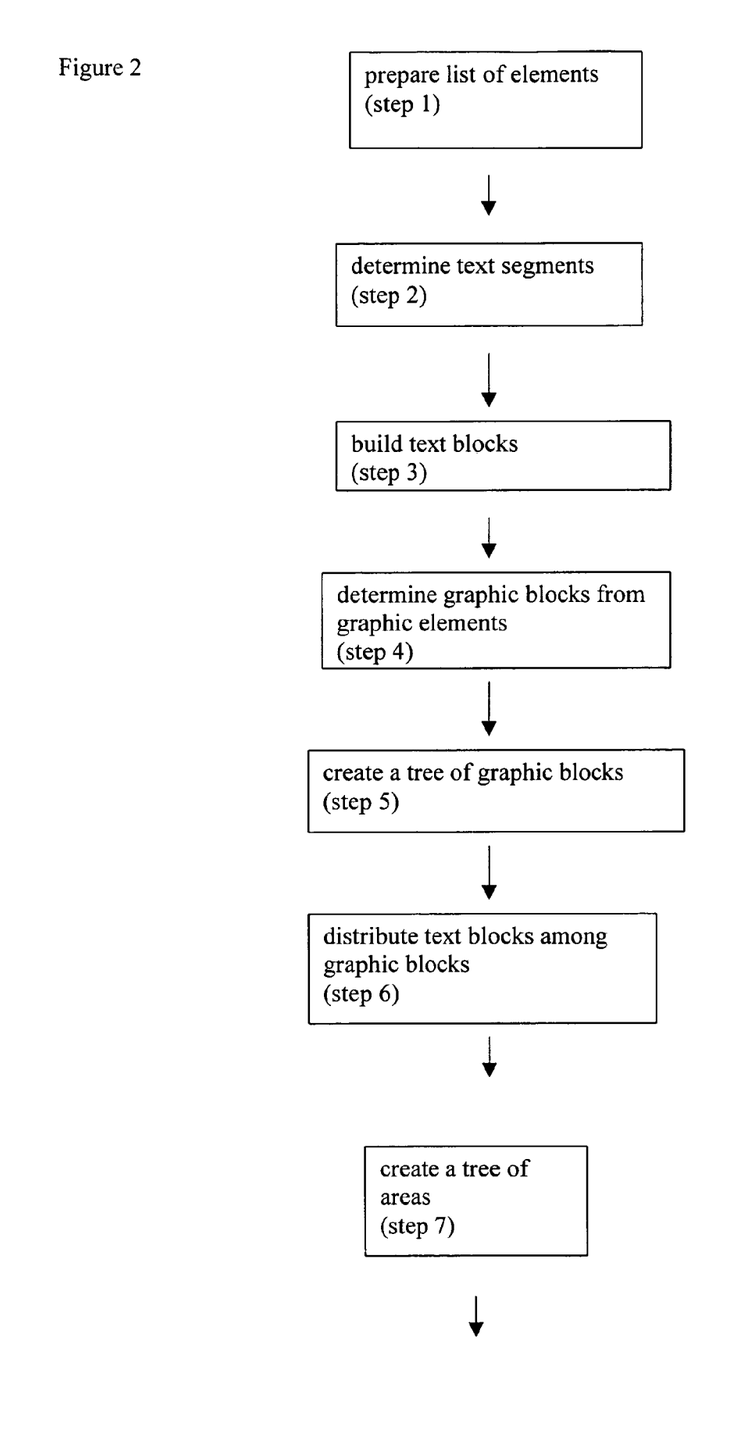
FIG. 2 is a flowchart of an illustrative method according to the present invention.

FIG. 2 is a flowchart of an exemplary method according to the present invention for converting the data into the internal format for publication. In a first part of the method, various structures of the newspaper page are recognized, preferably first by performing the recognition process for each page separately. In step 1, the step of analyzing text and/or graphic elements on the current newspaper page is performed. This analysis is especially important for digital (postscript sources), which may contain non-standard fonts and multi layer overlapped images. Preferably, this step of analysis includes the steps of preparing a list of text and graphic elements with properties for each element. Next, the visibility and overlapping characteristics for each graphic element are determined. Next, connected lines are located and frames are recognized. Texts with special shadowing effects and/or other special text effects are then preferably located, as are texts which are not visible on the printed page. More preferably, font analysis is then performed in order to understand special symbols (developed as fonts) and non standard ASCII coding of text.

In step 2, text segments are determined. A text segment is a text line or portion of line which lies inside one column of the newspaper page. Preferably, the attributes of the text segments are also determined by using style sheets or layout guidelines.

In step 3, text blocks are built. Each text block consists of a set of aligned text segments with the same or similar styles.

Next, in step 4, the graphic blocks are determined from the graphic elements. Each graphic block consists of a set of graphical elements, which are in a single rectangular area.

In step 5, preferably a tree of graphic blocks is created, such that each child block is nested inside the corresponding parent block.

In the next portion of the process, the different types of blocks are integrated. In step 6, the text blocks are distributed among graphic blocks.

In step 7, a tree of areas within the layout structure is created as an aggregate of graphic and text blocks which lie within the same area of the layout. Each area preferably has a main graphic block and three arrays: text blocks, graphic blocks and areas.

As an example, a graphic chart may contain a frame, axis lines, chart paths and text near the graphed data and the axes. In this example, the frame is the main graphic block. The paths of the chart and axes are elements of the graph array, while the text elements are elements of text array. If this chart contains a framed "subchart", this subchart becomes an element of the area array.

In step 8, a hierarchical net is created from these different areas. The net is a graph of the areas, which are then connected by edges which represent the relative location of the areas.

In a further part of the process, the areas are additionally collected into entities. In step 9, the graphic blocks are further processed for separation into vertical and horizontal lines. The horizontal and vertical lines in the newspaper layout play an important role as separators between entities (articles). A portion of these lines are actually curves which contain both some vertical and some horizontal elements. This step requires these curves to be separated into horizontal and vertical lines.

In step 10, optionally and preferably, lines are qualified as separated and decorated ambiguities are resolved. For example, certain horizontal and vertical lines act as text decoration, rather than separating articles. Examples of such lines include, but are not limited to, text underscoring lines, a pair of parallel lines which may be used to decorate a byline, and so forth. This step preferably uses fuzzy logic algorithms to detect decoration lines.

In step 11, separate articles of the newspaper, or other units of information, are preferably extracted to form each entity. Each entity consists of a set of blocks which represents article, ad, single photo or data. In step 12, net relations beyond and on the left of titles are removed. In step 13, net relations on the right side of titles are removed in special cases.

Steps 11-13 are preferably used to differentiate entities. In step 11, the net is cut along separation lines, such that the net is now divided into a few separate, unconnected, parts. After that each separate part is tested. If some part contains only one entity, steps 12 and 13 are not performed for this part. Instead, the algorithm passes directly to step 14 for recognition of the internal structure of the entity. If some part of the net contains a plurality of entities, it is cut beyond, and to the left of, titles in step 12. If after step 12, a part of the net is determined to contain a plurality of entities, such a part is passed to step 13 for cutting on the right side of the title.

In step 14, optionally and preferably, various types of specific units of data are recognized, including continuations; pictures and other graphic images; and captions.

In step 15, entities are created from areas. The reading order is then preferably determined for each entity element. In step 16, any additional ambiguities are preferably resolved.

In a further preferred stage of this method, post processing is performed for all newspaper pages. In step 17, links are created between entities. In step 18, the data is output to the XML format.

Figure 3:
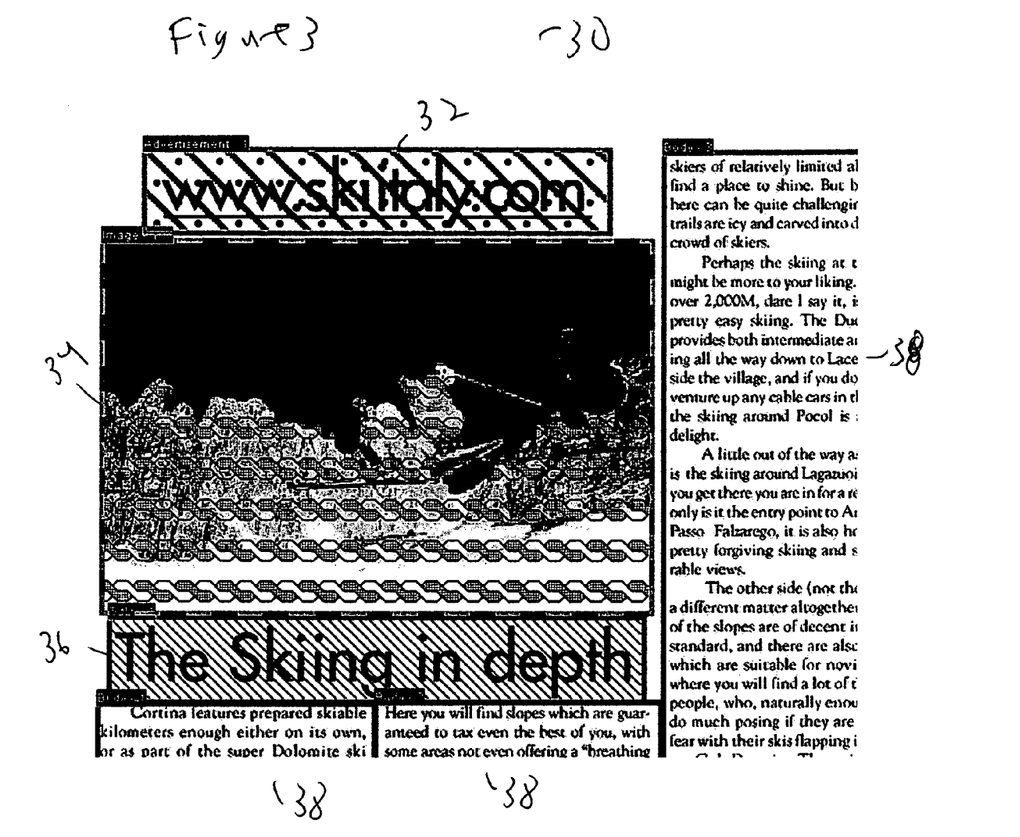
FIG. 3 shows an exemplary basic layout of a newspaper page after being processed by the method of the present invention.

FIG. 3 shows a portion of an exemplary newspaper page which has been processed according to the method of the present invention. As shown, a newspaper page 30 features a plurality of objects, which are illustrative, non-limiting examples of some of the different types of objects recognized by the previously described process. As shown, newspaper page 30 features an advertisement 32, an image 34 and a title 36 for an article. For the article itself, there is shown a plurality of body objects 38. Each body object 38 contains text for the article, arranged in columns as shown.

While the invention has been described with respect to a limited number of embodiments, it will be appreciated that many variations, modifications and other applications of the invention may be made.

What is claimed is:

1. A method for automatically publishing data in a final publication format, wherein the data is in the form of a newspaper having an original, existing format including a plurality of pages, each page having a predetermined layout comprising a plurality of independently standing data blocks, each block having an internal structure, the method comprising:

obtaining a scanned representation of said newspaper, said representation preserving said layout, from said representation automatically analyzing the newspaper to decompose the predetermined layout of each page of the newspaper in the original, existing format into said plurality of blocks, each block representing an object; said analyzing furthermore applying knowledge of newspaper structure and identifying at least one logical relationship between said blocks;

converting each object to an internal publication format, said internal publication format identifying and preserving said internal structure of said blocks within said objects, said internal publication format furthermore preserving said layout as a relationship between said objects; said internal publication format furthermore preserving said logical relationship; and said internal publication format comprising a mark-up language to indicate said objects and features of said internal structure wherein said mark-up language is XML; and rendering said internal publication format to incorporate said objects, said layout and respective internal structures and said logical relationship in the final publication format; thereby forming said newspaper into said final publication format from objects in said internal publication format by rendering.

2. The method of claim 1, wherein said layout is decomposed by classifying each object according to a category selected from the group consisting of an article, an advertisement, a picture not otherwise associated with said article or said advertisement, and general data.

3. The method of claim 1, wherein said object is constructed in said converting from content and at least one attribute of said object in said layout.

4. The method of claim 3, wherein said object is composed of a plurality of primitives, each primitive containing a portion of content and an attribute.

5. The method of claim 4, wherein each attribute is stored in an XML tag.

6. The method of claim 5, wherein at least one attribute describes a relationship between said primitives of said object.

7. The method of claim 1, wherein said rendering said internal publication format is performed according to a specific hardware device for displaying the final publication format.

8. The method of claim 7, wherein said rendering said internal publication format is performed only after a query from the specific hardware device is received.

9. The method of claim 1, wherein said analyzing the data to decompose said layout further comprises:
preparing a list of text and/or graphic elements for each object;
determining properties of each element; and
recognizing structural layout properties of the data in an original format.

10. The method of claim 9, wherein said determining properties of each element includes determining visibility and overlap characteristics for each graphic element.

11. The method of claim 9, wherein said determining properties of each element includes determining a special characteristic for each text element.

12. The method of claim 9, wherein the data is in a form of a newspaper, and said analyzing the data to decompose said layout further comprises: determining each text segment for each object; and building a text block from a plurality of aligned text segments.

13. The method of claim 12, wherein said analyzing the data to decompose said layout further comprises: creating a graphic block from a plurality of graphic elements; creating a hierarchy of graphic blocks; and distributing text blocks in said hierarchy of graphic blocks.

14. The method of claim 1 wherein said form of a newspaper comprises at least one property, said property selected from a group including multiple columns, titles, subtitles, images and image captions.

15. The method of claim 1, wherein said blocks correspond to content items in said newspaper.

16. The method of claim 15, wherein said blocks comprise a part of a column or article in said newspaper.

17. The method of claim 16, wherein said block includes a text portion, such that it is related to the physical layout of said newspaper.

18. The method of claim 1, wherein said blocks rendered in said final publication format may be viewed in an order defined by the user.

19. The method of claim 1 wherein said data comprises new data and archived data.

20. The method of claim 19, wherein said archived data comprises microfilm data.

21. The method of claim 20, wherein said analyzing said data further comprises converting said microfilm data into a digital format.

22. The method of claim 1, further comprising presenting said final publication format to a user through a Graphic User Interface (GUI).

23. An electronic system tangibly embodied in a computer for automatically publishing received data of a pre-existing newspaper, the newspaper in a computerized format, the system comprising:

(a) at least one source of newspaper data, said source preserving an original, structure of the newspaper, the computerized format comprising a plurality of pages, each page having a predetermined layout comprising a plurality of independently standing data blocks, each block having an internal structure;

(b) a mark-up language distiller module implemented on a processor, for converting the newspaper from said original format to a mark-up language format, wherein said mark-up language distiller module is configured to apply knowledge of newspaper structure and automatically analyzes the newspaper data in said original, existing digital format to (1) decompose the newspaper data into said plurality of blocks, each block with said internal structure representing an independent data object, each object having content and at least one attribute of the data, such that each object is converted to said mark-up language format, said markup language distiller module further analyzing and preserving said structure; and (2) identify at least one logical relationship between blocks, said markup language distiller module further analyzing and preserving said logical relationship, wherein said mark-up language format is XML; and (c) a publisher server for rendering the data from said mark-up language format to a final publication format, said final publication format being a rendered electronic format for display incorporating, as objects, said blocks with said internal structure, and further defining interrelationships between said objects as part of said electronic format; said publication server thereby forming said newspaper into said final publication format from objects in said internal publication format by rendering.

24. The system of claim 23, further comprising:
(d) a repository for storing said plurality of objects, wherein each object features data in said XML format and an image of the data.

25. The system of claim 23, wherein said at least one source of data comprises a source of new data.

26. The system of claim 23, wherein said at least one source of data comprises a source of archived data.

27. The system of claim 26, wherein said source of archived data contains microfilm data.

28. The system of claim 27, further comprising a microfilm publisher for converting said microfilm data into said digital format.

29. A method for automatically publishing data of a pre-existing document in a final publication format, wherein the data is received in an original, existing format comprising a plurality of pages, each page having a predetermined layout comprising a plurality of independently standing data blocks, each block having an internal structure the method comprising:

obtaining a representation of said preexisting document, said representation preserving said layout;

from said representation, automatically analyzing the pre-existing document to decompose the data received in the original, existing format into a plurality of objects, each object corresponding to one of said blocks; said analyzing furthermore applying knowledge of document structure and identifying at least one logical relationship between said blocks;

preparing a list of text and/or graphic elements for each object;

determining properties of each element, including determining visibility and overlap characteristics for each graphic element within said object;

recognizing structural layout properties of the data in an original format;

converting each object to an internal publication format; said internal publication format furthermore preserving said logical relationship; and said internal publication format comprising a mark-up language to indicate said objects and features of said internal structure, wherein said mark-up language format is XML and rendering said internal publication format in the final publication format, said final publication format presenting said blocks as said independently standing objects incorporating said internal structure and said layout and said logical relationship; thereby forming said newspaper into said final publication format from objects in said internal publication format by rendering.

30. A method for automatically publishing received data in a final publication format, the data having an original, existing format comprising a plurality of pages, each page having a predetermined layout comprising a plurality of independently standing data blocks, the method comprising:

obtaining a representation of said received data having an original existing format, said representation preserving said layout;

from said representation, automatically analyzing the pages to decompose the pages of the data received in the original, existing format into a plurality of objects, said objects corresponding to said blocks; said analyzing furthermore applying knowledge of page structure and identifying at least one logical relationship between said blocks;

preparing a list of text and/or graphic elements for each object;

determining properties of each element, including determining a special characteristic for each text element;

recognizing structural layout properties of the data in an original format;

converting each object to an internal publication format; said internal publication format identifying and preserving said internal structure of said blocks within said objects, said internal publication format furthermore preserving said layout as a relationship between said objects; said internal publication format furthermore preserving said logical relationship; and said internal publication format comprising a mark-up language to indicate said objects and features of said internal structure, wherein said mark-up language format is XML, and rendering said internal publication format in the final publication format such as to include said recognized structure in said objects and said logical relationship and to include said layout; thereby forming said received data into said final publication format from objects in said internal publication format by rendering.

31. A method for automatically publishing received data in a final publication format, wherein the data is in the form of a newspaper, the newspaper having an original, existing format comprising a plurality of pages, each page having a predetermined layout comprising a plurality of independently standing data blocks, each block having structural layout properties, the method comprising:

obtaining a representation of said newspaper, said representation preserving said layout;

from said representation, automatically analyzing the newspaper to decompose the data received in the original, existing format into a plurality of objects, said objects corresponding to said independently standing blocks; and said analyzing furthermore applying knowledge of newspaper structure and identifying at least one logical relationship between said blocks;

preparing a list of text and/or graphic elements for each object;

determining properties of each element;

recognizing said structural layout properties of the data in an original format;

determining each text segment for each object;

building a text block from a plurality of aligned text segments;

converting each object to an internal publication format; said internal publication format furthermore preserving said logical relationship; and said internal publication format comprising a mark-up language to indicate said objects and features of said internal structure, wherein said mark-up language format is XML and rendering said internal publication format in the final publication format to comprise said blocks as objects incorporating said structural layout properties, and to include said layout and said logical relationship; thereby forming said newspaper into said final publication format from objects in said internal publication format by rendering.

* * * * *